(12) United States Patent
Abato, Jr.

(10) Patent No.: US 7,537,423 B1
(45) Date of Patent: May 26, 2009

(54) CHAIN TIEDOWN FOR TRANSPORTATION VEHICLE

(75) Inventor: Ralph L. Abato, Jr., New Britain, CT (US)

(73) Assignee: Ancra International, LLC., Hawthorne, CA (US)

( * ) Notice: Subject to any disclaimer, the term of this patent is extended or adjusted under 35 U.S.C. 154(b) by 0 days.

(21) Appl. No.: 12/004,760

(22) Filed: Dec. 21, 2007

Related U.S. Application Data

(63) Continuation-in-part of application No. 11/897,037, filed on Aug. 28, 2007.

(51) Int. Cl.
*B60P 7/08* (2006.01)

(52) U.S. Cl. .................. 410/107; 410/106; 410/111; 410/112; 410/116

(58) Field of Classification Search ................ 410/101, 410/102, 97, 106, 107, 109, 110, 111, 112, 410/116; 24/299, 116 R, 265 CD; 248/499
See application file for complete search history.

(56) References Cited

U.S. PATENT DOCUMENTS

| | | | |
|---|---|---|---|
| 3,018,079 A | | 1/1962 | Stough |
| 3,865,048 A | * | 2/1975 | Wallace .................. 410/111 |
| 4,242,965 A | | 1/1981 | Granet |
| 5,674,033 A | | 10/1997 | Ruegg |
| 5,676,060 A | | 10/1997 | Van Lierde |
| 5,853,164 A | | 12/1998 | Hunt |
| 6,250,861 B1 | | 6/2001 | Whitehead |
| 6,315,509 B1 | * | 11/2001 | Nadherny et al. ........... 410/116 |
| 6,527,487 B2 | | 3/2003 | Adams |

* cited by examiner

*Primary Examiner*—Stephen Gordon
(74) *Attorney, Agent, or Firm*—Edward A. Sokolski; Don B. Finkelstein

(57) ABSTRACT

A device has a chain fitting which is connected to the floor of a transportation vehicle, such as a flatbed trailer. The chain fitting has a cap on one end thereof, which is installed in a mating aperture formed in the vehicle floor. The side rail has an aperture opposite the floor aperture, this aperture having a smaller diameter than the floor aperture. A side rail is installed along an edge of the floor, tis side rail having an aperture positioned opposite the aperture in the floor and having a smaller diameter than the floor aperture. The cap is installed on the top side of the floor with a short chain piece attached thereto running through the aperture with a second cap at the lower end which is secured to the lower end of the chain. A length of securing chain is attached to the chain fitting, this securing chain being attached to cargo to be restrained. The cap is partially beveled along its contact surface with the floor and engages the sides of the aperture in the floor. This beveled portion operating in conjunction with the aperture sides enables ready release of the cap with one's fingers.

4 Claims, 6 Drawing Sheets

CHAIN TIEDOWN FOR TRANSPORTATION VEHICLE

This application is a continuation in part of application Ser. No. 11/897,037 filed on Aug. 28, 2007

FIELD OF THE INVENTION

This invention relates to chain tie downs for use in restraining or positioning cargo on a transportation vehicle such as a flatbed trailer and more particularly to such a device which has an end piece which is mounted in a mating aperture on the floor of a vehicle.

BACKGROUND OF THE INVENTION

Chains tied to the floor of a vehicle for use in driving conveyer belts or for retaining cargo in place are used extensively in the prior art. Such a system which drives conveyor belts is described in U.S. Pat. No. 5,676,060 issued on Oct. 14, 1997 to Van Leerde. The prior art tie downs for securing chains to the floor of a vehicle are often difficult to remove, particularly when they become corroded when there are adverse environmental conditions. This is obviously highly undesirable. The device of the present invention overcomes these shortcomings by providing a tie down which is not secured to the vehicle floor but rather mounted thereon so that when there is tension on a chain attached thereto, the attachment is firm and secure, yet such tie down can readily be released even when corroded.

SUMMARY OF THE INVENTION

The device of the present invention includes a cap portion, which is fitted into a mating aperture on the floor of the vehicle. The cap is installed on the upper surface of the trailer floor with a chain attached thereto positioned and hanging beneath the upper floor surface. A cap which is partially beveled is installed in an aperture in the floor, the beveled portion abutting against the an edge of the floor aperture. A chain is attached to the cap and hangs beneath the upper floor surface. When pressure is placed on the top edge of the cap below the beveled area, the cap can be tipped up to allow the opposite cap edge to be accessed for gripping and pulling the chain above the floor.

It is therefore an object of this invention to facilitate the removal of tie down chain from its mounted position on the floor of a vehicle.

DETAILED DESCRIPTION OF THE INVENTION

Figure 1:
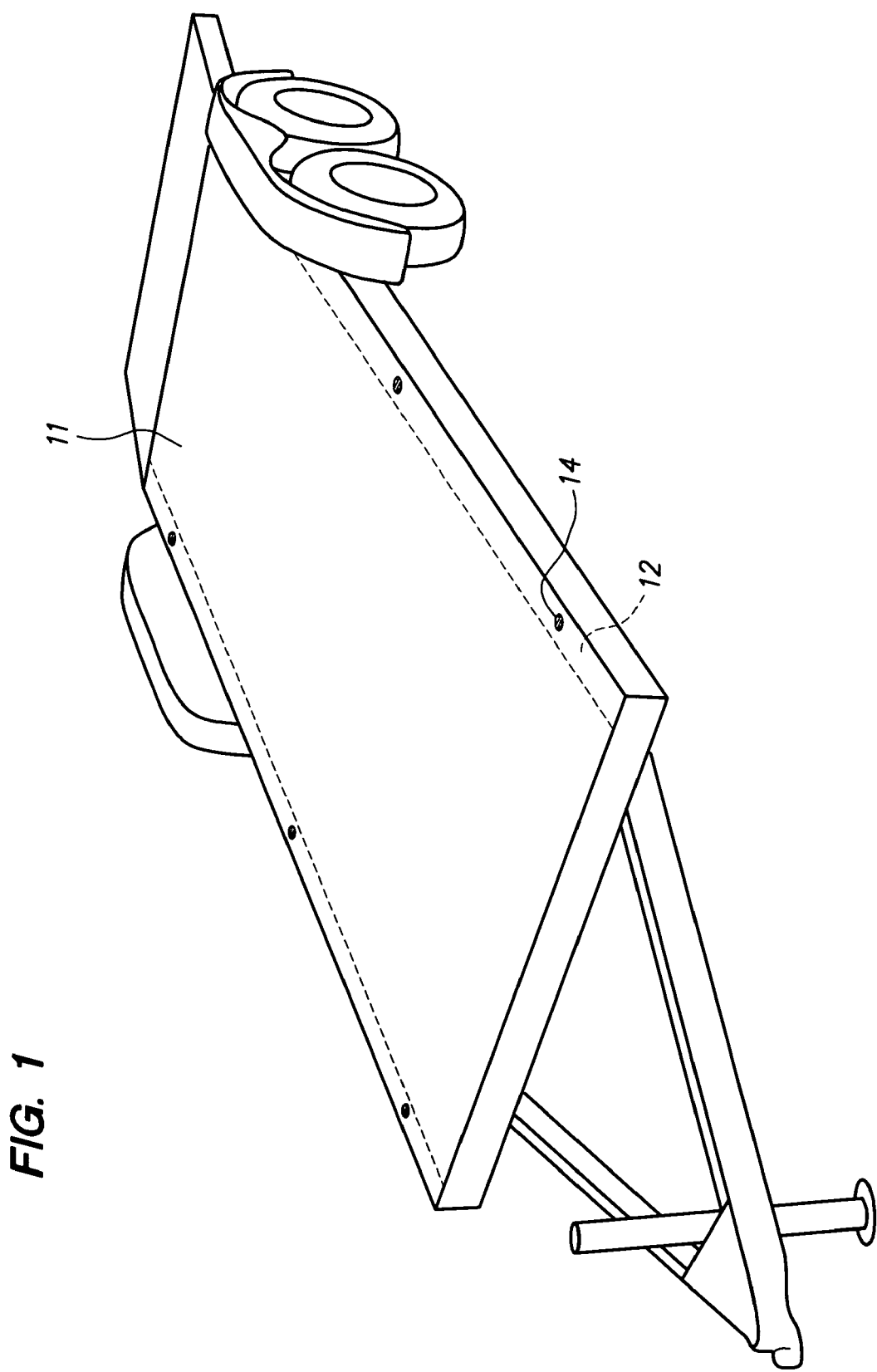
FIG. 1 is a top perspective view showing a flatbed trailor on which the device of the invention may be installed.

Referring to FIG. 1, a typical flat bed trailer on which the device of the invention can be installed is illustrated. Beneath the top surface of the floor 11 along the edges thereof, a side rail is installed.

Referring now to FIGS. 2-8, a preferred embodiment of the invention is illustrated. Vehicle floor 11 has a substantially round aperture 11a formed there through. Chain fitting 13 has a cap 14 on the upper end thereof and a short support chain piece 15 running from cap 14 to lower cap 20 on the opposite side thereof. Cap 14 is installed in aperture 11a formed in floor structure 11. The part of the cap which fits into aperture 11a is shaped so that the lower end portion of the cap readily fits into aperture 11a formed in floor structure 11. The diameter of aperture 11a is greater than that of aperture 12a formed in rail 12 so that a rim 17 is formed between the two apertures against which the bottom edge portion 14a of cap 14 abuts.

Figure 6:
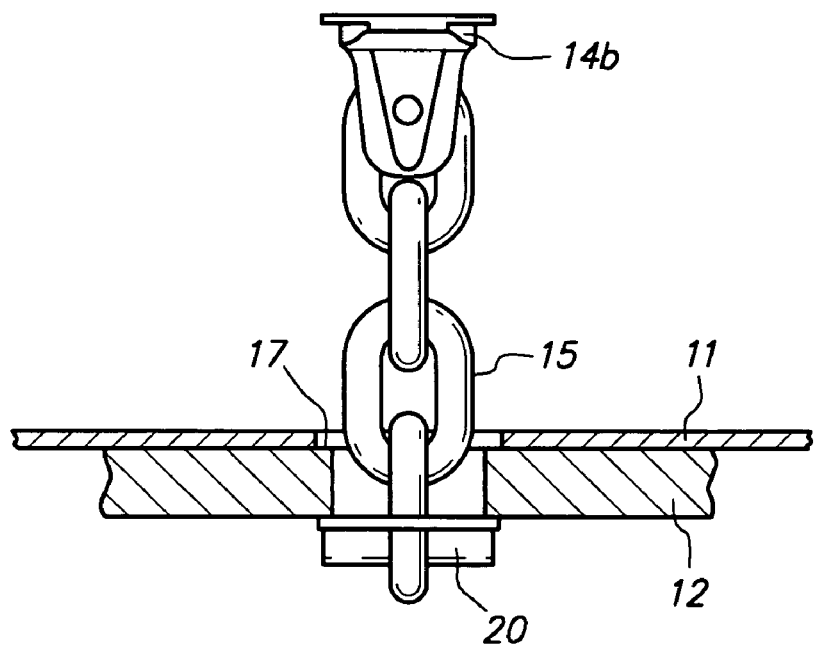
FIG. 6 is a side elevational view partly in cross section illustrating the cap and chain being driven upwardly.
Figure 7:
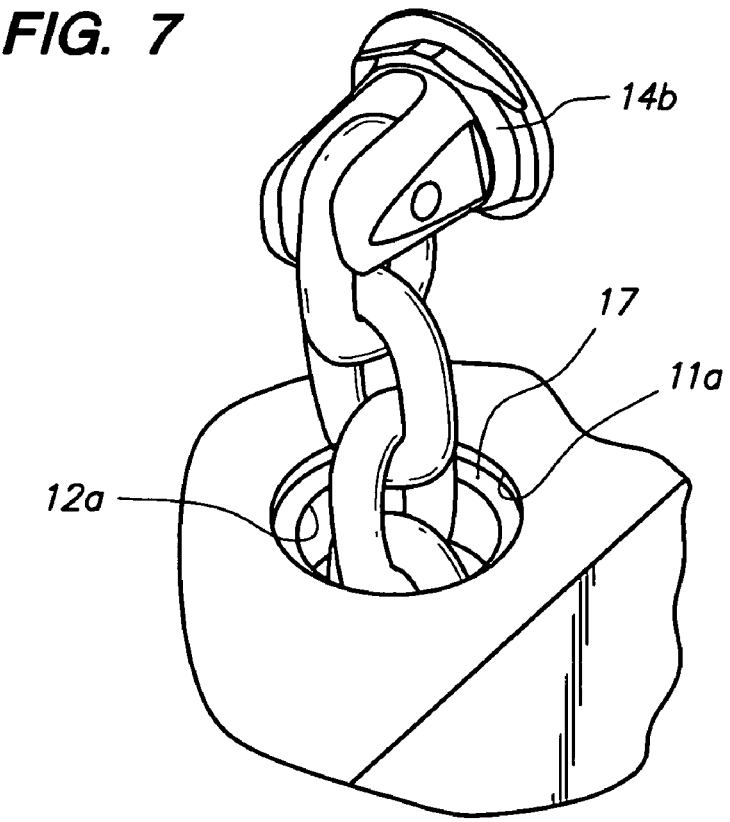
FIG. 7 is a top perspective view showing the cap and chain being partially drawn upwardly.
Figure 8:
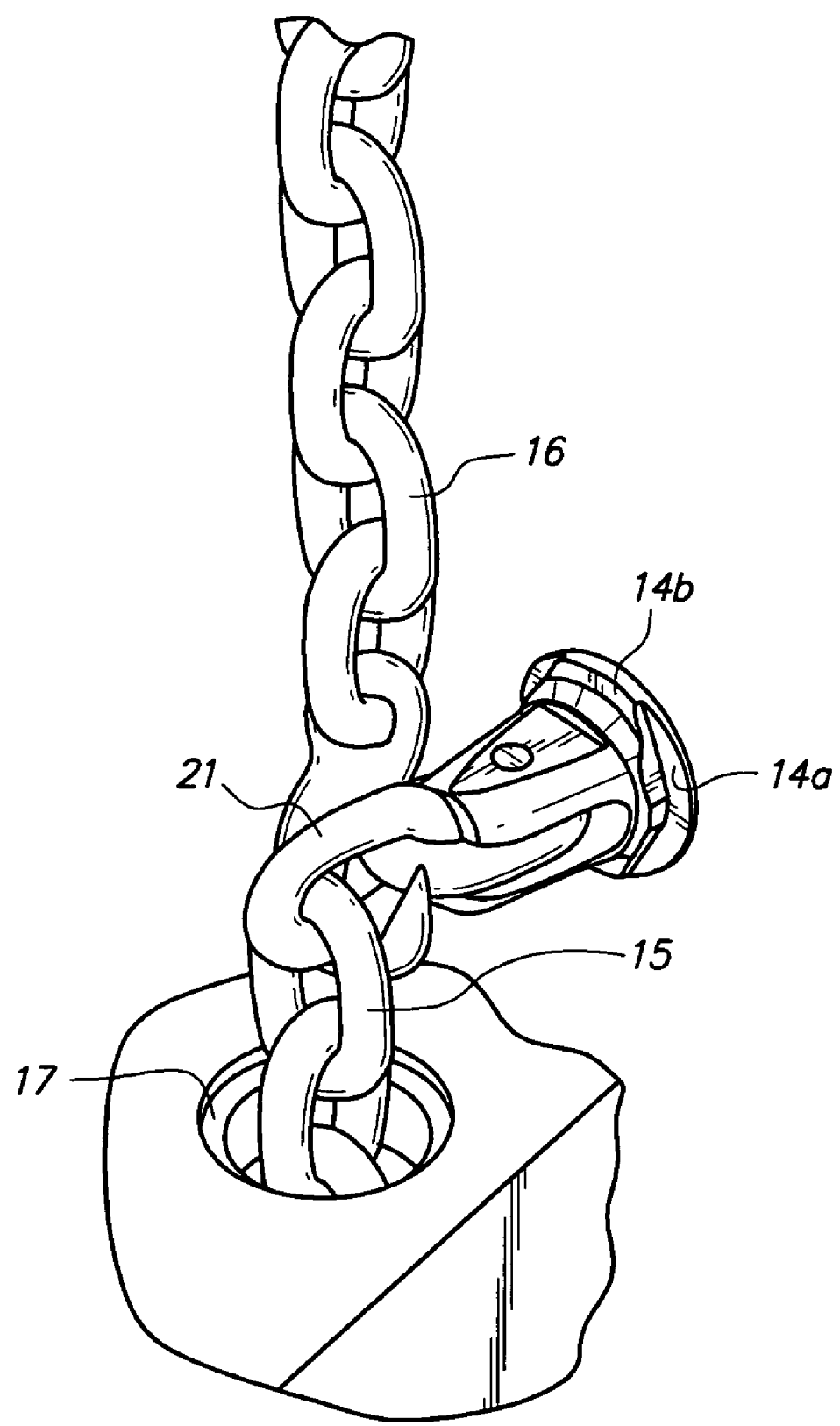
FIG. 8 is a top perspective view showing the entire chain being drawn upwardly.

As can best be seen in FIGS. 6-8, the portion 14a of the cap that fits into aperture 11a is beveled, the beveled portions 14b of the cap and the aperture sides fitting together in mating engagement.

As shown in FIG. 8, a securing chain 16 for use in either retaining or positioning cargo is firmly attached to chain piece 15 by grab hook 21. Chain 16 generally runs substantially upwardly from the floor so that when it is placed under tension it will draw the lower cap 20 tightly against the rail 12, as shown in FIG. 6, into the aperture in the floor and will not act to draw the cap out of the aperture.

Figure 2:
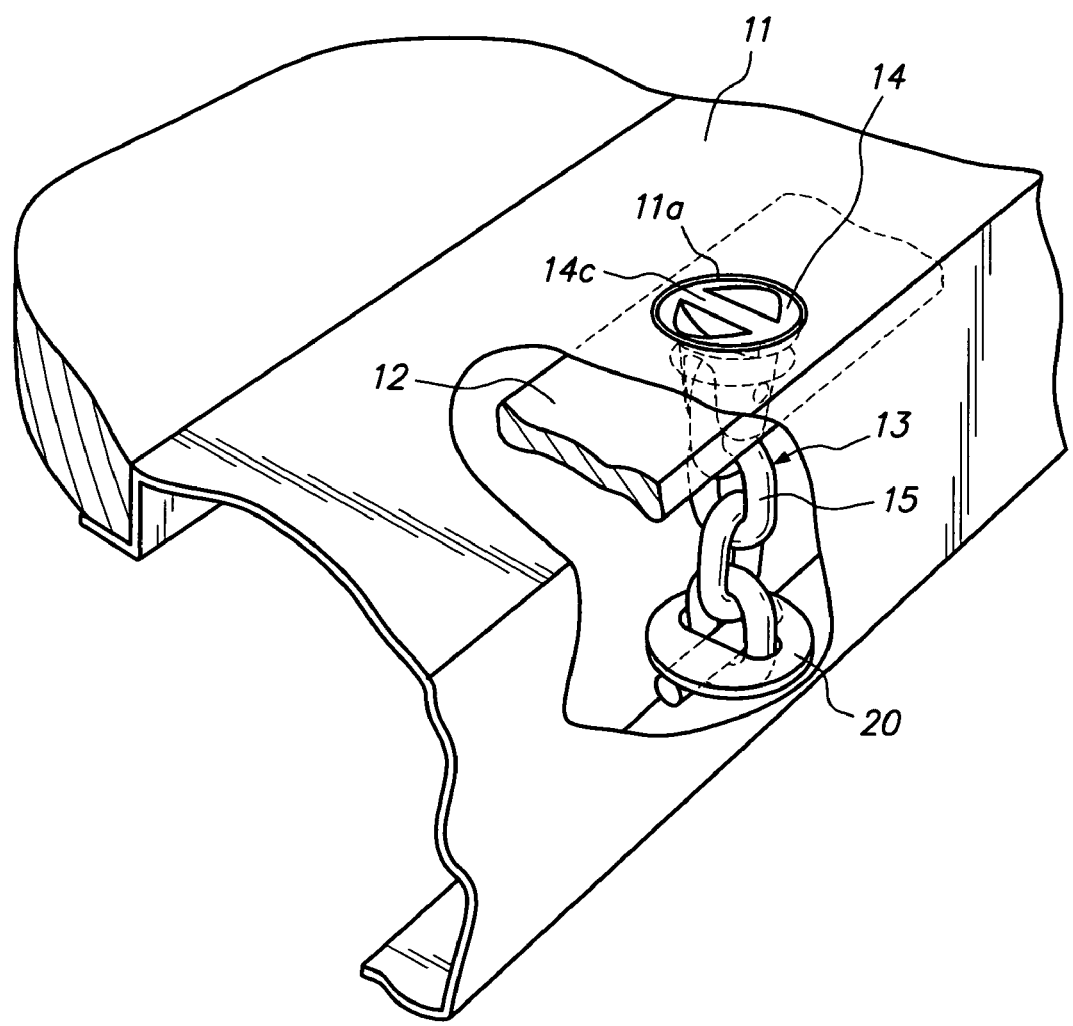
FIG. 2 is a top perspective view of a preferred embodiment of the connector cap and the chain connected thereto in its at rest position on the vehicle floor.
Figure 3:
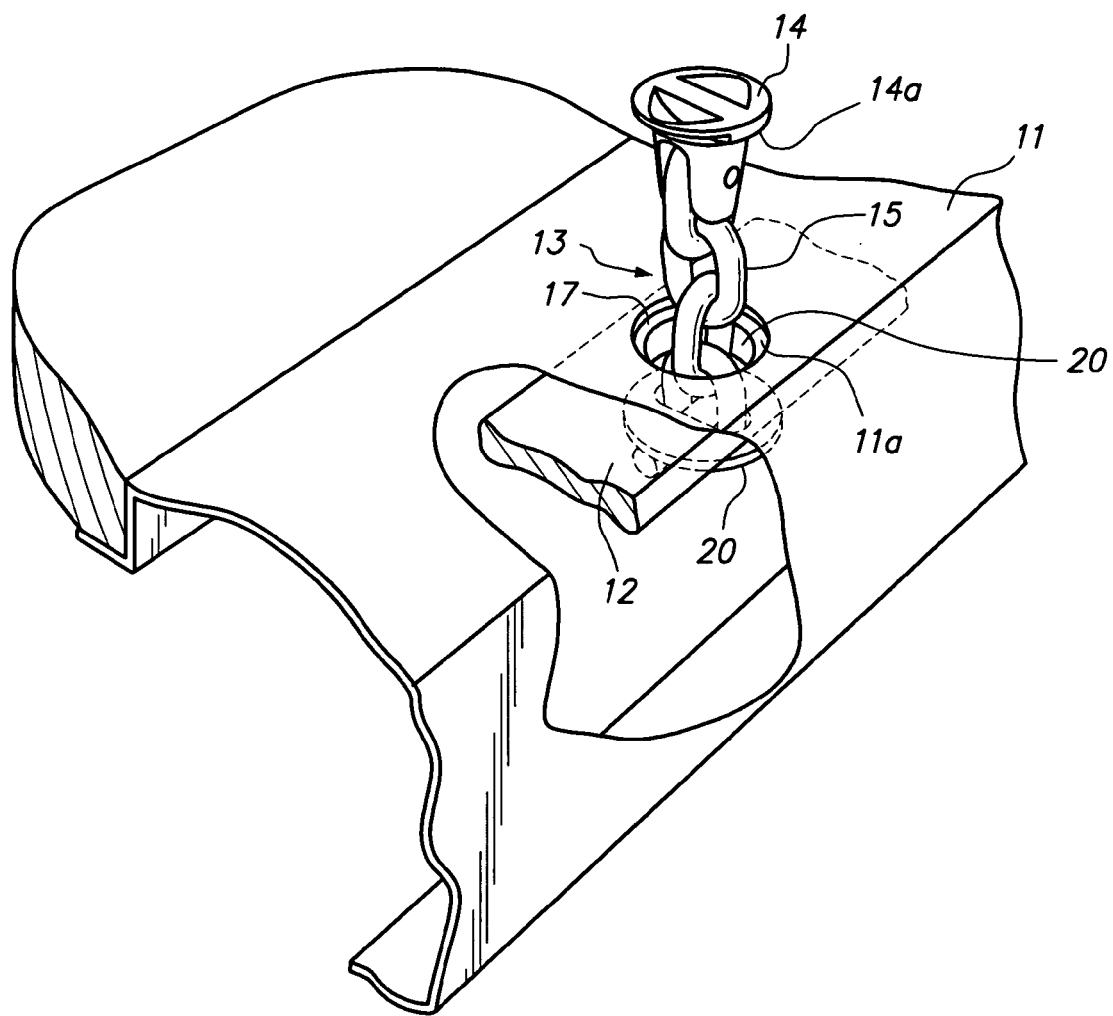
FIG. 3 is a top perspective view of the preferred embodiment.
Figure 4:
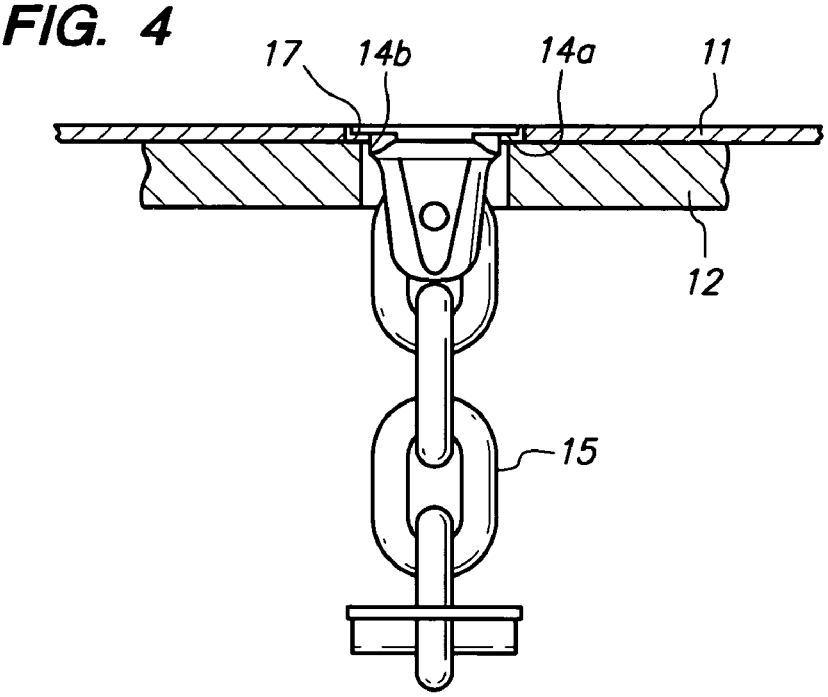
FIG. 4 is a side elevational view partly in cross section of the preferred embodiment.
Figure 5:
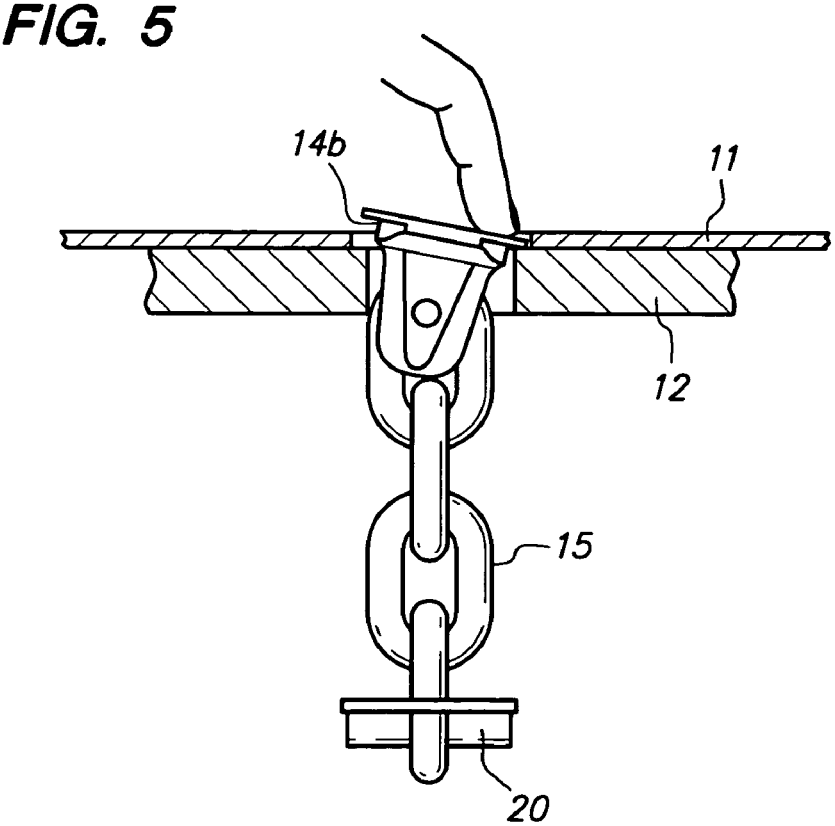
FIG. 5 is a side elevational view, partly in cross section showing the cap being swiveled upwardly to facilitate the lifting of the chain uupwardly.

While the cap 14 is held on the floor, when the chain fitting is not is use, a shown in FIG. 4, the beveled portion 14b permits ready release of the cap from the aperture in the floor so that the chain fitting can readily be pulled up into position for use in securing cargo. The cap can readily be released, by pushing down on it from the top of the vehicle floor, as shown in FIG. 5. As shown in FIG. 2, a handle 14c is also installed on the cap, as another option to facilitate its release manually.

While the invention has been described and illustrated in detail it is to be understood that this is intended by way of illustration and example only and not by way of limitation, the spirit and scope of the invention being limited by the terms of the following claims.

I claim:

1. A device in form of a chain fitting for firmly holding a support chain to a floor of a vehicle, said floor having a floor aperture formed therein, a rail structure including a bracket and attached to the floor, said rail structure having a bracket aperture formed therein directly opposite the floor aperture, a support chain being attached at a first end thereof to a second chain, said second chain being attached to cargo being restrained in said vehicle, said device comprising:
   an upper cap attached to a first end of said chain fitting;
   said upper cap being installed on a top side of the floor with a second end of said chain fitting running through said floor aperture and bracket aperture and through a top side of the bracket;
   a lower cap attached to said second end of said chain fitting opposite to said first end thereof;
   said bracket aperture having a greater diameter on a top side than a bottom side to form a rim between said top side and said bottom side of the bracket aperture, a top portion of said upper cap comprising a beveled edge portion that is removably attachable and abutting against said rim; and means for removably attaching said support chain to the second end of said chain fitting;

wherein the chain fitting and the support chain are firmly retained to the floor of the vehicle and to prevent removal of the chain fitting from the floor of the vehicle; and wherein at least one portion of the chain fitting is accessible for connecting with the support chain while the at least one portion of the chain fitting is enclosed within an area occupied by the bracket.

2. The device of claim 1 further comprising a chain piece along a section of the chain fitting to provide at least one location to secure the cargo to the chain fitting using a grab hook.

3. The device of claim 1 wherein the means for removably attaching said support chain to the second end of the chain fitting comprises a clamping hook which fits over the support chain and the chain fitting; wherein said upper cap detachably connects with the floor of the vehicle utilizing a handle built-in the upper cap; and wherein the beveled edge portion contacts the top side of the bracket to provide detachability of the upper cap from the floor aperture to allow repositioning or retaining of the chain fitting to secure the cargo.

4. The device of claim 1 wherein said upper cap has a handle formed thereon for use in installing and removing the upper cap from the bracket aperture and the floor aperture; wherein the upper cap attaches to the second end of said chain fitting and receives tension from said chain fitting; and wherein the lower cap tightly fits into the floor aperture to prevent the lower cap being released from the floor aperture when the chain fitting occupies a substantially vertical position.

* * * * *